May 29, 1962 C. A. HIGGINS ET AL 3,037,078

TELEPRINTER SYSTEM

Filed July 20, 1960 2 Sheets-Sheet 1

CHARLES A. HIGGINS
GEORGE L. KING
INVENTORS

BY Rudolph J. Juick
ATTORNEY

CHARLES A. HIGGINS
GEORGE L. KING
INVENTORS

BY Rudolph J. Juich
ATTORNEY

United States Patent Office 3,037,078
Patented May 29, 1962

3,037,078
TELEPRINTER SYSTEM

Charles A. Higgins, Boonton, and George L. King, Morris Plains, N.J., assignors to Radio Frequency Laboratories, Inc., Boonton, N.J., a corporation of New Jersey Filed July 20, 1960, Ser. No. 44,217
10 Claims. (Cl. 178—70)

Figure 1:
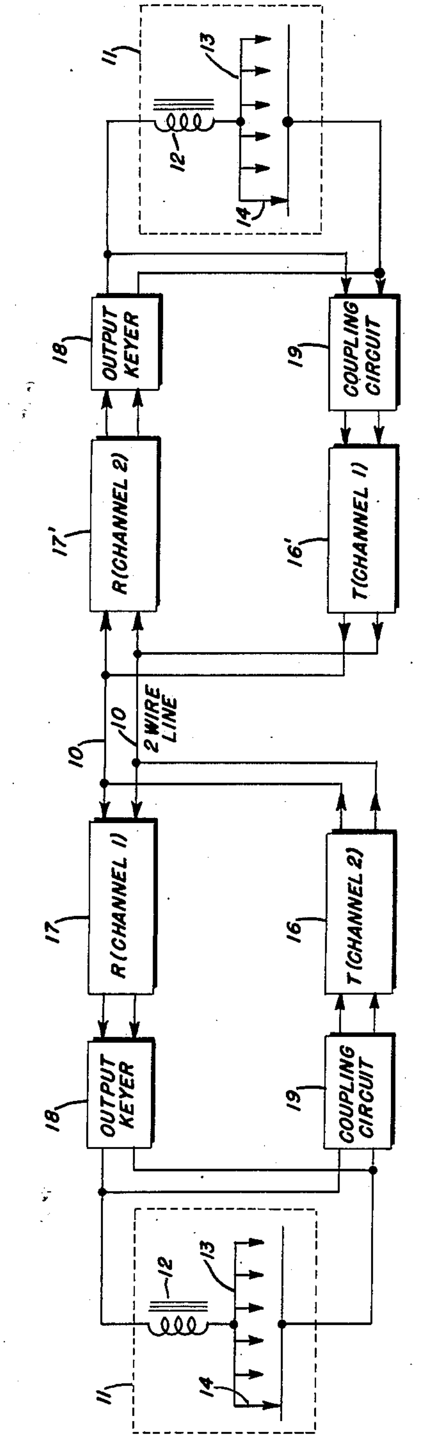

This invention relates to a teleprinter system and more particularly to a novel electronic output keyer circuit usable either in a simplex teleprinter operation or in a novel half duplex teleprinter operation wherein remotely spaced printers may be connected together by a two-wire line, each printer being usable for both transmitting and receiving functions.

In teleprinter systems of the type to which this invention is directed, the various characters, figures, punctuation marks, etc., are represented by a succession of wave pulses having a precise time duration, all in accordance with a radio-type code. The time duration of each wave pulse and the spacing therebetween are of the order of milliseconds, and it is common practice to designate one current pulse as a Mark signal and the other as a Space signal. The signals are generated by telegraph transmitters and transmitted over any desired communication link, such as, telephone lines, microwave links, or the like, to receiving printers. The coded Mark and Space signals are distinguished at the receiver printer, such that generally only the Mark signals are effective to cause operation of the printer selector magnet mechanism and bring about the power operation of the type bar corresponding to the particular received code characteristics.

Normally, in a simple teleprinter system involving two printers, the selector magnet of each printer is connected in one common D.C. loop having a D.C. voltage supply. Each printer contains a keyboard which operates a set of keying contacts which are in series with the common D.C. loop. Therefore, manual operation of the keyboard of either printer will cause identical information to be printed on both local and remote machines. It also follows that manual operation of the keyboard of the receiving printer will break up the local copy being made on the sending printer. This "break" feature is desirable since it can be used to signify that the sending operator should cease typing and stand by to receive. In such an arrangement, there are practical limits which prevent very long D.C. loop connections between printers.

A system made in accordance with this invention permits the use of a nominal 600 ohm, 2-wire line, a radio transmission link, or the like, between the two printers instead of the D.C. loop. This system also retains the operational features of the printers, as mentioned in the preceding paragraph. Both transmitting and receiving operations are possible with either printer, each function being controlled at the printer keyboard and without requiring any manual adjustments of the equipment for either transmitting or receiving. Frequency shift audio signals may be employed on the 2-wire line, one carrier channel being used for each direction of communication. The Mark and Space functions of the teleprinter selector magnet, when the keyboard is operated, are employed to shift the frequency of an audio frequency carrier above and below the center frequency of the carrier. Thus, two discrete audio frequencies are generated, one representing a Mark function and one representing a Space function. At the receiving teleprinter, the Mark and Space tones are converted to D.-C. pulses of current for operating the selector magnet. Such equipment includes a tone oscillator for transmitting information and a signal amplifier, discriminator and output keying circuit for receiving information. Different transmitting tones are transmitted in each direction with the input of each equipment filtered to accept only the tones originating at the remote transmitting printer and to reject tones of its own local transmitting oscillator.

Teleprinters which are of well-known design, include the selector magnet having an armature which may be actuated with the application of about 12 volts thereto. Due to the large inductance of the selector magnet, the flow of current therethrough is impeded with the result that the operation of the selector magnet armature is relatively slow with only 12 volts supply thereto. For proper operation of a teleprinter, fast keying is required and, consequently, slow selector magnet operation cannot be tolerated. To overcome slow operation of the selector magnet operation, it is common practice to utilize a high voltage, constant current, source for actuation of the selector magnet. For example, a D.C. voltage source in the order of 120 volts at 60 milliamperes is fed to the selector magnet of the printer through a high resistance whereby the current builds up quickly despite the large selector magnet inductance.

Often, it is desired to operate teleprinter systems of the type described from a low voltage source, such as 12 volt battery supplies. Transmitters and receivers are easily designed for use with such low voltage supplies, particularly where transistors are utilized therein. As described above, however, for fast teleprinter operation, a relatively high voltage, constant current, source is necessary for energizing the selector magnet. In addition to a novel duplex telegraph system, our invention includes an electronic output keyer controlled by the received signals from a remote printer installation, such signals being obtained from the receiver discriminator circuit. The keyer comprises a D.C. to D.C. converter which provides a 120 volt D.C. signal with a low voltage D.C. Mark signal input thereto of one polarity, and provides zero voltage output with a low voltage D.C. Space signal input of opposite polarity applied thereto. The 120 volt D.C. Mark signal is supplied to the selector magnet through a relatively large resistor, as a constant current source for rapid actuation of the selector magnet.

D.C. to D.C. converters are well known in the art and generally comprise a power oscillator circuit, the output from which oscillator is rectified and filtered to provide the desired D.C. output. Most prior art D.C. to D.C. converters cannot, however, be keyed on and off at a high rate, and such prior art converters are not, therefore, suitable for use in the telegraph system of our invention wherein rapid keying is necessary. The D.C. to D.C. converter of our invention includes a novel switching means for turning the converter oscillator on and off very rapidly. The converter output is connected to the teleprinter with the converter providing a 120 volt D.C. output signal thereto under Mark conditions and a zero output signal under Space conditions, as mentioned above.

The converter per se may obviously be used in a simplex teleprinter operation, i.e., in an arrangement which includes a transmitter terminal at one station and a receiver terminal at a second station, the message being sent in one direction over a pair of wires, a radio circuit, or the like. For half duplex teleprinter operation, the converter also provides the necessary high voltage D.C. potential to the printer for the sending operation. A novel circuit which includes a Zener diode connects the teleprinter to any suitable frequency shift transmitter terminal. The resultant half duplex system provides means whereby operation of the receiving printer functions to break the copy of the sending printer.

An object of this invention is the provision of a novel arrangement for keying an oscillator whereby oscillations may be abruptly stopped and initiated.

An object of this invention is the provision of a D.C. to D.C. converter which may be rapidly keyed, and which is suitable for use in a teleprinter system requiring a "constant current" source of potential for operation of a teleprinter selector magnet.

An object of this invention is the provision of a teleprinter system which includes an electronic output keyer which utilizes no mechanical relays.

An object of this invention is the provision of a teleprinter system wherein two remotely disposed printers are connected together by a two-wire A.C. line and wherein each printer can be used for both transmitting and receiving.

These and other objects and advantages will become apparent from the following description when taken with the accompanying drawings illustrating the invention. It will be understood, however, that the drawings are for purposes of illustration and are not to be construed as defining the scope or limits of the invention, reference being had for the latter purpose to the claims appended hereto.

Figure 2:
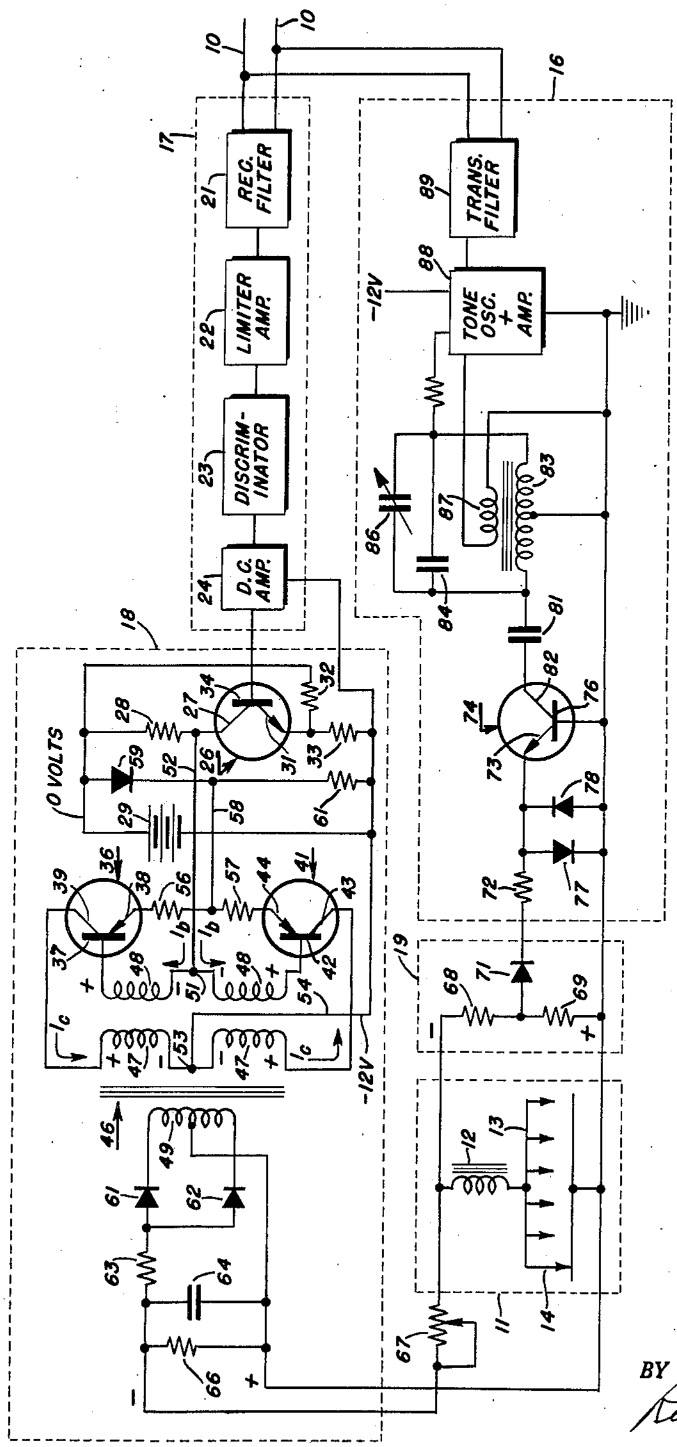

In the drawings wherein like reference characters refer to like parts in the several views:

FIGURE 1 is a block diagram of a half-duplex, two-wire, teleprinter system employing our novel output keyer and teleprinter-to-transmitter coupling circuit; and FIGURE 2 is a schematic circuit diagram, which parts in block diagram form, of a single teleprinter apparatus made in accordance with this invention.

Reference is first made to FIGURE 1 of the drawings wherein there is shown a block diagram of a half duplex teleprinter communication system which includes a pair of teleprinter stations, or terminals, interconnected by a two-wire line 10. Each station includes a teleprinter 11 comprising a series connected printer selector magnet 12 representing a telegraph receiver recorder, and key contacts 13. The actual printers are of well known conventional construction with the key contacts normally closed by a contact 14 until a key is depressed, as in typing. Contact 14 always stays closed during reception and whenever the key board is not being depressed. Contact 14 opens only during transmission and is entirely mechanical. It opens during the sending of each character, then closes again after the character has been transmitted. Each station includes also a transmitter terminal and a receiver terminal, which terminals may be of conventional design. The transmitter and receiver terminals of one station are designated 16 and 17, respectively, while the transmitter and receiver terminals of the other station are designated 16' and 17', respectively. Similar transmitter and receiver terminals are utilized at the interconnected stations, the equipment at the two stations being identical except that different transmission tones are transmitted in each direction with receivers including filters tuned to reject its own station transmitter tones and to accept only the tones originating at the other station transmitter. By way of example, the channel 1 transmitter 16' may transmit either a Mark frequency signal comprising a 467.5 cycle per second tone or a Space frequency signal comprising a 382.5 cycle per second tone, with the channel 1 receiver 17 tuned to receive such tones and to reject the channel 2 tones, while the channel 2 transmitter 16 may transmit either a Mark frequency signal comprising a 637.5 cycle per second tone or a Space frequency signal comprising a 552.5 cycle per second tone, with the channel 2 receiver 17' tuned to receive such tones and to reject the channel 1 tones. In the above example, center frequencies of 425 and 595 cycles per second are employed for the respective channels 1 and 2, it being understood that only the Mark and Space frequency signal tones are transmitted, and not the above-mentioned center frequencies, in the system of our invention.

The receiver terminals 17 and 17' are each connected through a novel electronic output keyer 18 to the station teleprinter 11, which keyer converts low voltage D.-C. Mark and Space signals from the receivers to relatively high D.-C. voltages suitable for rapid operation of the teleprinters. For half duplex operation of the type illustrated in FIGURE 1, a novel coupling circuit 19 is utilized to connect the teleprinters 11 to the associated transmitter terminals 16 and 16'. In the illustrated system, the teleprinters, and transmitter and receiver terminals may be of any conventional design. Our invention involves the novel output keyer 18 (which may be used in either a simplex arrangement, not shown, or in the illustrated half duplex arrangement), the novel coupling circuit 19, and the half duplex arrangement utilizing the said keyer and the coupling circuit.

Reference is now made to FIGURE 2 of the drawings wherein a single station which includes the channel 1 receiver 17 and channel 2 transmitter 16 is shown. The receiver, which may be of conventional design, comprises a band pass filter 21 tuned to pass only the channel 1 frequencies received from the transmitter 16' (not shown in FIGURE 2) connected thereto through the link 10. Signals from the transmitter 16 are greatly attenuated and do not pass through the filter. The filtered Mark and Space signals from the communication link which pass through the receiver band pass filter are applied to a limiting amplifier 22 which may be of conventional design and utilizing, for example, several resistance-capacitance coupled stages, each operating as a limiting amplifier stage. The limited signals are then applied to a tuned discriminator 23 which may be of conventional design and which functions to convert the Mark signals to negative D.-C. voltages and the Space signals to positive D.-C. voltages, for example. The D.-C. signals are applied through a D.-C. amplifier 24 to the input circuit of the novel electronic output keyer 18 of our invention; the D.-C. amplifier applying a relatively large positive D.-C. potential to the output keyer 18 during Mark signals and a very low positive D.-C. potential thereto during Space signals. It will here be understood that in a frequency shift system, which is the type under consideration, the carrier is shifted to a frequency above its center-band frequency for a Mark function and to a frequency below center for a Space condition (or vice versa). Two tones are transmitted; one during the Mark or "on" time, and one during the Space or "off" time; it being understood that a signal is transmitted at all times, whereby either a positive Mark signal or a less positive Space signal from the receiver is applied to the input of the keyer 18 at all times.

The electronic output keyer 18 comprises a keying, or switching, transistor 26 of the NPN type connected in a common emitter configuration. The transistor collector 27 is shown connected through a load resistor 28 to the positive end (designated as 0 volts) of a 12 volt source, designated 29, to produce the necessary reverse bias condition. The emitter 31 is connected to the junction between series connected resistors 32 and 33 connected to the 12 volt supply and, in this way, a reverse bias is provided for the emitter-base junction. The base 34 of the transistor is connected to the output from the D.-C. amplifier 24 which output comprises, as mentioned above, either a positive Mark signal or a much lower positive Space signal.

With a Mark signal frequency input to the receiver, the positive receiver output signal is applied to the base 34 of the transistor 26 whereupon the transistor conducts vigorously. With a large collector current, a large voltage drop is produced across the resistor 28 whereupon the voltage at the collector 27 drops. With a Space signal frequency input to the receiver, a very low positive receiver output signal is applied to the base 34 of the transistor 26, whereupon the transistor is cut off. With the transistor cut off, substantially no current flows through the load resistor 28 whereby the collector is at a substantially zero potential. As described above, with a Mark signal frequency input to the receiver, the positive receiver output signal at the base 34 causes the transistor to conduct vigorously whereupon a large voltage drop is produced across the resistor 28 and the collector potential falls substantially to a −12 v. level.

The oscillator section of the output keyer includes a first transistor 36 having a base electrode 37, an emitter electrode 38, and a collector electrode 39; also a second transistor 41 having a base electrode 42, an emitter electrode 43 and a collector electrode 44. A transformer 46 having a pair of connected primary windings 47, 47, a pair of interconnected feedback windings 48, 48 and a center-tapped output winding 49 is included. The tap 51 between the feedback windings 48, 48 is connected through lead wire 52 to the collector 27 of the switching means 26, while the ends of the said feedback windings are connected to the base electrodes 37 and 42 of the oscillator transistors. The tap 53 between the primary windings 47, 47 is connected through a lead wire 54 to the negative end of the 12 volt supply, while the ends of the primary windings are connected to the collector electrodes 39 and 43 of the oscillator transistors. A pair of low value resistors 56 and 57 are connected in series between the transistor emitter electrodes 38 and 44, which resistors provide current stabilization therefor. A constant positive D.-C. potential is applied to the emitter electrodes through the resistors 56 and 57 and a lead wire 58 connected to the junction therebetween, the positive potential being provided by means of a series connected diode 59 and resistor 61 connected across from positive to negative of the 12 volt source, with the diode connected to the positive end of the 12 volt source and poled in a forward direction. The diode 59 is of the silicon type and a voltage drop of approximately 1 volt is developed thereacross in the illustrated circuit arrangement. It will be understood that the silicon diode exhibits a substantially constant voltage drop of approximately one volt, regardless of the amount of increased current flow therethrough up to the time the diode burns out. Hence, it will be understood that a substantially constant negative potential of approximately one volt is applied to the emitters 38 and 44 with respect to bases 37 and 42. As mentioned above, with the transistor 26 cut off, the collector 27 assumes substantially the potential at the positive end of the 12 volt source because substantially no current flows through the resistor 28. It will be apparent, then, that with the transistor 26 cut off, the lead wire 52 connecting the collector 27 to the tap 51 is positive with respect to the junction between the emitter resistors 56 and 57 whereupon the emitter electrodes 38 and 44 are under a reverse bias condition, with respect to the base electrodes such that substantially no current flows through the transistors 36 and 41 and the oscillator is prevented from oscillating. As mentioned above, with a Mark signal input to the receiver, the receiver output comprises a positive D.-C. signal which is applied to the base 34 of the switching transistor 26 whereby the transistor conducts. The resultant large voltage drop across the resistor 28 with the transistor switching means 26 in the "on" condition places the point 51 at a negative potential with respect to the junction between the emitter resistors 56 and 57, and the emitter electrodes 38 and 44 are thereby provided with a forward bias with respect to the base electrodes whereby the oscillator is placed in condition for oscillation and does, therefore, oscillate.

The oscillator transistors 36 and 41 are connected in a parallel circuit arrangement wherein the transistors substantially simultaneously conduct and cut off. With a forward emitter-base bias on the oscillator transistors under Mark conditions, a base current $I_b$ flows in each of the transistor circuits, which base current results in collector currents $I_c$. The collector currents $I_c$ produce voltage drops across the primary windings 47, 47, as shown in FIGURE 2, whereby feedback voltages of the indicated polarity are induced in the feedback windings 48, 48. Consequently, the base currents $I_b$ will increase very rapidly to a maximum, limited by the base circuit resistance. The resultant positive feedback arrangements provide means whereby the transistors 36 and 41 operate, simultaneously, between full conducting and substantially cut-off conditions with the changes occurring substantially instantaneously whereby the transistor currents are of a substantial square wave form. So long as a Mark signal is applied to the receiver, the oscillator will oscillate, but with a Space signal input, the oscillator is cut off.

The oscillator output comprising a high voltage square wave, developed across the center-tapped secondary winding 49, the ends of which secondary winding are connected to diodes 62, 62 included in a full wave rectifier network. It will here be noted that the transformer 46 provides D.-C. isolation between the oscillator and D.-C. output of the keyer. The diode anodes are connected together and to a resistor 63 of a resistor-capacitor filter which includes also the shunt-connected capacitor 64. A fixed load resistor 66 is connected across the filter output, and the filtered D.-C. output is connected through a series connected variable resistor 67 to the teleprinter 11.

The oscillator components are selected to provide relatively high frequency oscillations on the order of 4,000 cycles per second, in the Mark or "on" condition of the apparatus. The transformer output winding 49 has a step-up voltage ratio whereby a rectified and filtered output voltage of, say, 120 volts D.-C. is provided across the load resistor 66 under Mark conditions. By use of a relatively high oscillator frequency, adequate filtering is provided with a small value filter resistor 63 and capacitor 64. Further, the time constant of the resistor 63 and capacitor 64 is sufficiently short such that high speed keying is possible which is essential for proper operation of the teleprinter. The resistor 66 provides a fixed load on the output of the oscillator and further reduces the time constant of the filter network. The series resistor 67, which is preferably variable, is adjusted to allow the proper flow of current through the selector magnet 12 of the teleprinter for proper operation thereof.

During receiving operations, successive Mark and Space signal frequencies from the line 10 are provided at the receiver input, with the receiver output comprising a low positive D.-C. signal under Space conditions and a relatively high positive D.-C. signal under Mark conditions. The Space signal cuts off the transistor switching means 26 and the oscillator does not function. Therefore, zero D.-C. output voltage is obtained from the rectifier and filter means connecting the oscillator to the teleprinter, and no current flows through the selector magnet 12. With a positive Mark signal output from the receiver, the switching means 26 is placed in full conduction condition whereupon the voltage at the collector 27 drops. The collector 27 is connected to the base electrodes of the oscillator transistor whereby the emitter-base bias of such transistors is changed from a reverse to a forward bias upon conduction of the switching transistor 26. With a forward emitter-bias on the transistors 36 and 41, the oscillator oscillates at a high frequency. A negative 120 volt D.-C. potential is obtained from the rectifier and filter means connecting the oscillator to the teleprinter, whereby a current flows through the selector magnet 12 and closed contact 14 of the teleprinter to operate the selector magnet armature and associated printing mechanism (not shown) of the teleprinter. The contact 14 remains closed during the receiving operation, with only the selector magnet armature and associated mechanism operating.

It will be understood that the above-described portion of the system from the receiver 17 through the teleprinter 11 is suited for use in a simplex system for the reception only of messages. The coupling circuit 19 and transmitter 16 are utilized in an arrangement wherein it is desired to utilize the teleprinter 11 for sending messages in the opposite direction, either over the same line 10, or over another line. Before describing the transmitting operation, it will here be understood that during the time the distant operator is not sending a message, the distant transmitter is conditioned to send a steady Mark signal. With a continuous Mark signal frequency input to the receiver, the oscillator oscillates continuously to thereby provide a steady 120 volt D.-C. signal across the load resistor 66. The resistor 67 is adjusted to allow, normally, 60 milliamperes to flow through the selector magnet 12, which magnet winding has a D.-C. resistance of about 200 ohms. With 60 milliamperes flowing through a 200 ohm selector magnet, 12 volts is developed across the selector magnet winding. (This, of course, is the condition after the steady state condition is obtained, that is, after the delay caused by the inductance of the magnet.) As is well understood by those skilled in this art, during transmission of a message, the manually operable keys of the teleprinter keyboard are depressed one at a time to mechanically actuate the transmitting contacts. The contact 14 always opens upon actuation of the keyboard and remains open the entire time a character is being sent. The other contacts of the teleprinter, however, make and break in accordance with a teleprinter code for each character.

The coupling circuit 19 comprises a pair of series connected voltage dividing resistors connected across the series connected selector magnet and transmitting contacts of the teleprinter. The resistors 68 and 69 in series comprise a much larger resistance value than the selector magnet winding. As mentioned above, with a Mark frequency signal input to the receiver 17, the voltage drop across the teleprinter, and hence the resistors 68 and 69 in shunt therewith, is 12 volts when any transmitting contact of the teleprinter is closed. Every time all of the teleprinter contacts are open, the selector magnet is removed from the circuit and the voltage across the resistors 68 and 69 increases; the voltage across such resistors being fixed by the potential drop across the variable resistor 67 subtracted from the filtered output voltage of the D.-C. to D.-C. converter across the load resistor 66.

A diode 71 is connected to the junction between the voltage dividing resistors 68 and 69. The diode is of the type which exhibits a Zener voltage when subjected to a reverse-potential, such diodes having a high inverse resistance up to the Zener voltage, but above the Zener voltage the resistance decreases. The Zener diode is connected in opposition to the normal flow of current, with the anode connected to the negative junction between the resistors 68 and 69. The cathode of the Zener diode is connected through a limiting resistor 72 to the emitter electrode 73 of a switching transistor 74. The base electrode 76 of the transistor and the circuit common of a tuned LC oscillator is connected to the positive end of the resistor 69. A parallel pair of oppositely poled diodes 77 and 78 are connected between the emitter and base electrodes of the transistor, which diodes limit the peaks of both forward and reverse emitter voltages. The frequency shift transmitter, which may be of any suitable design, includes a capacitor 81 connecting the transistor collector electrode 82 to a tuned oscillator circuit which includes an inductor 83, capacitor 84, and a trimmer capacitor 86. The tuned oscillator circuit is included in a feedback winding 87 coupled to the inductor 83 and other suitable circuitry not shown in detail but included in the block 88 labeled Tone Oscillator and Amplifier. With the transistor 74 in a cut-off, substantially non-conducting condition, the capacitor 81 is, in effect, removed from the oscillator circuit and the frequency of oscillation thereof is determined by the tuned oscillator circuit components which include the inductor 83 and capacitors 84 and 86. Under such conditions, the oscillator produces a Mark signal frequency which is amplified and connected through a transmitter band pass filter 89 to the communication link 10. When the transistor 74 conducts, the capacitor 81 is clamped to the common of the oscillator circuit through the said transistor thereby placing the capacitor in the tuned oscillator circuit and shifting the frequency of the said circuit downwardly to a Space frequency signal.

The function of the coupling circuit 19, in connecting the teleprinter to the transmitter, will now be described. The diode 71, of the coupling network, has a Zener voltage of about 23 volts whereby such diode exhibits a large inverse resistance up to 23 volts and a much lower resistance of the order of 10–20 ohms above 23 volts. With a 120 volt D.-C. output across the load resistor 66 of the D.C. to D.C. converter under steady Mark signal conditions during which the distant operator is not sending a message, and with the resistor 67 adjusted to provide about a 12 volt drop across the selector magnet winding when the transmitting contacts are closed, it will be apparent that the 12 volt potential which appears also across the voltage divider 68 and 69 is less than the Zener breakdown voltage whereby the diode 71 will not conduct. During operation of the key board of the teleprinter 11, the teleprinter contacts open and close at a high speed, and the voltage drop across the resistors 68 and 69 changes from 12 volts to a sufficiently high voltage to cause the Zener diode 71 to conduct. The purpose of the voltage divider network comprising the resistors 68 and 69 is to lower the voltage at the Zener diode, when the transmitting contacts are open, to a value that just exceeds the Zener, or reverse breakdown, voltage of the diode. When the diode 71 conducts, a forward biasing voltage from the voltage dividing network is applied to the emitter 73 of the transistor 74. Due to the limiting characteristics of the diode 78, the voltage is very small, of the order of 0.6 volt. The diodes 77 and 78, which are of the same type as the diode 59, provide a substantially constant voltage drop thereacross regardless of the magnitude of the current flow therethrough within the current carrying capability of the diodes. A pair of parallel connected diodes connected in opposite polarity sense are used to prevent transient voltages, which result from rapid changes in the flux field strength in the selector magnet winding, from damaging the transistor 74. That is, the emitter-base voltages, both forward and reverse, are limited to safe values by the back-to-back connected diodes 77 and 78.

When the transmitting contacts are closed, and the voltage across the Zener diode 71 is insufficient to cause conduction thereof, the transistor 74 is cut off and the capacitor 81 is, in effect, removed from the transmitter oscillator circuit whereby the oscillator produces a predetermined Mark frequency signal. During operation of the keyboard of the teleprinter to open and close the transmitting contacts, the voltage drop across the voltage divider resistors 68 and 69 increases sufficiently, during the time the contacts of the teleprinter are all open, to cause the Zener diode 71 to conduct thereby placing the capacitor 81 in the transmitter oscillator circuit to lower the frequency to a Space signal output.

From the above description, it will be apparent that we provide a relatively simple teleprinter system which allows one printer to be used for both transmitting and receiving, and which operates with a low voltage power source. The conventional receiving terminal of the one equipment converts the frequency shifted carrier signals from the transmitting equipment into corresponding low voltage positive and relatively high positive signal pulses. The relatively low voltage positive (Space) and higher positive (Mark) pulses are fed to the novel D.C. to D.C. converter of our invention for the production of 120 volt D.C. pulses during Mark conditions and a zero voltage output during Space conditions. The D.C. to D.C. converter output is connected through a limiting resistor 67 to the teleprinter whereby the selector magnet 12 is energized during Mark conditions and is deenergized during Space conditions of the receiver. The received signals do not effect operation of the transmitter since the teleprinter contacts remain closed during receiving whereby the voltage across the voltage divider resistors 68 and 69 remains below the level necessary for conduction of the Zener diode 71, being either 12 volts for Mark or zero volts for Space. Hence, the one transmitter sends a steady Mark frequency signal during receiving and stand by conditions. The transmitter frequency is shifted to a Space signal output only when all the teleprinter transmitting contacts are open during transmission of a message.

As described above, a steady Mark frequency signal is sent by the transmitter until the transmitter frequency is shifted to a Space signal by operation of the teleprinter keyboard. With a Mark signal input to the receiver a 120 volt D.-C. signal is applied to the teleprinter. When the equipment is operated for transmitting information, the selector magnet circuit is opened by operation of the transmitting contacts. The voltage across the divider network comprising the resistors 68 and 69 rises from the 12 volt potential drop to a sufficiently high voltage to cause the Zener diode 71 to conduct in the reverse direction to thereby provide a forward emitter-base bias on the NPN type transistor 74 whereupon the transistor conducts to result in a shift in frequency of the transmitter oscillator to a Space frequency signal which is passed through the filter 80 and thence over the transmission line 10. It will be apparent that if one operator is sending and the distant operator desires to send, he can break the copy of the one operator by operating his own teleprinter keyboard. Both messages are garbled, signifying that the distant operator wishes to have the one operator stop sending so he may send a message.

Having now described our invention in detail, in accordance with the requirements of the patent statutes, various changes and modifications will suggest themselves to those skilled in this art. For example, the diode 59 and resistor 61 may be eliminated from the circuit and the positive side of the 12 volt supply 29 connected directly to the junction between the resistors 56 and 57. In place of the diode and resistors, then, a small battery or cell could be included in series with the lead 52 with the positive pole of the battery connected to the junction 51 between the feedback windings 48, 48 and the negative pole connected to the collector 27. With the transistor 26 non-conducting, the battery would supply a reverse base-emitter bias on the oscillator transistors to prevent operation thereof, and to quickly stop oscillations upon receiving a Space signal. Further, two oscillator transistors 36 and 41 are shown in the drawing whereas it will be understood that an oscillator employing a single transistor may be utilized providing a sufficient output may be obtained therefrom for proper operation of the teleprinter selector magnet. It is intended that these and other changes and modifications may be made without departing from the spirit and scope of the invention as defined in the following claims.

We claim:

1. A circuit for switching a fixed frequency transistor oscillator on and off comprising means applying a reverse bias voltage between the base and emitter electrodes of the oscillator transistor to normally prevent oscillation thereof, a switching means having input and output circuits, the said output circuit including a resistor connected to a source of D.-C. potential, means connecting the base electrode of the oscillator transistor to the source of D.-C. potential through the said resistor in the output circuit of the switching means, the said oscillator being conditioned for oscillation only when a voltage applied to the input circuit of said switching means exceeds a predetermined magnitude whereby the said switching means conducts and a current flows through the said resistor to provide a voltage drop thereacross sufficient to overcome the reverse bias on the oscillator transistor.

2. The invention as recited in claim 1 wherein the said switching means comprises a transistor of the NPN type and the oscillator transistor comprises a PNP type.

3. The invention as recited in claim 1 wherein the said means applying a reverse bias voltage between the base and emitter electrodes of the oscillator transistor comprises a series connected diode and resistor connected between positive and negative ends of a D.-C. voltage source with the diode poled in the forward direction for current flow therethrough, the said diode having a substantially constant voltage drop thereacross with changes in current therethrough, and means connecting the junction between the said series connected resistor and diode to the emitter electrode of the oscillator transistor.

4. The invention as recited in claim 1 wherein the said means applying a reverse bias voltage between the base and emitter electrodes of the oscillator transistor comprises a single D.-C. potential source in series circuit with the said means connecting the base electrode of the oscillator transistor to the source of D.-C. potential.

5. In a communication system of the class including a teleprinter having a selector magnet and a signal frequency receiver connected to a communication link and producing first and second D.-C. outputs in accordance with the receiver input signal; a D.-C. to D.-C. converter which includes an oscillator connecting the receiver output to the teleprinter, the said converter being of the type which provides zero output with a first D.-C. output of the receiver and provides a D.-C. potential output of large enough amplitude to quickly actuate the selector magnet with a second D.-C. output of the receiver.

6. The invention as recited in claim 5 wherein the D.-C. to D.-C. converter includes biasing means connected to the oscillator to normally prevent oscillations thereof, switching means connected to the receiver output, the said switching means being cut off with a first D.-C. output of the receiver and conducting with a second D.-C. output of the receiver, the said switching means including an output element connected through a resistor to a D.-C. supply source, the said oscillator including a control element connected to the said D.-C. supply source through the resistor, the said switching means when conducting conditioning the said oscillator for oscillations.

7. The invention as recited in claim 5 wherein the communication system includes a transmitter and the teleprinter includes transmitting contacts under control of a keyboard; means connecting the selector magnet and a normally closed keyboard contact in series across the output from the D.-C. to D.-C. converter, a resistor connected in shunt with the teleprinter, a Zener diode, circuit elements including the Zener diode connecting the shunt resistor to the input circuit of the transmitter, the said Zener diode conducting only when all of the transmitting contacts are open, the said transmitter having an output of a first signal frequency when the Zener diode conducts and of a second signal frequency when the Zener diode is cut off.

8. In a communication system of the class including a teleprinter having a selector magnet and transmitting contacts under control of a keyboard, one contact being normally closed until actuation of any key of the keyboard, and a transmitter producing first and second frequency outputs; means connecting the selector magnet and normally closed transmitting contact in series across a D.-C. voltage source, a pair of series connected voltage dividing resistors connected across the series connected selector magnet and transmitting contact, a Zener diode having one end connected to the junction between the voltage dividing resistors, and circuit elements connecting the other end of the Zener diode to the input circuit of the transmitter, the Zener diode conducting in the Zener conducting region only when the transmitting contacts are all open.

9. The invention as recited in claim 8 including a signal receiver connected to the communication link, a D.-C.

to D.-C. converter having an input circuit connected to the receiver output circuit, and providing the said D.C. voltage to the teleprinter only when the input signal to the receiver is of a predetermined frequency.

10. The invention as recited in claim 8 wherein the circuit elements connecting the other end of the Zener diode to the input circuit of the transmitter include a series resistor and shunt connected first and second diodes which are oppositely poled.

References Cited in the file of this patent

UNITED STATES PATENTS

| | | |
|---|---|---|
| 2,794,856 | Turner | June 4, 1957 |
| 2,935,698 | Adams | May 3, 1960 |